Dec. 10, 1957 P. M. NADOLSKI 2,816,266
PHASE INDICATOR
Filed Aug. 24, 1956 3 Sheets-Sheet 1

$\phi = \sin^{-1} \frac{A}{B}$

INVENTOR
P. M. NADOLSKI
BY
Walter M. Hill
ATTORNEY

Dec. 10, 1957

P. M. NADOLSKI 2,816,266

PHASE INDICATOR

Filed Aug. 24, 1956

INVENTOR
P. M. NADOLSKI
BY
*Walter M. Hill*

ATTORNEY

United States Patent Office 2,816,266
Patented Dec. 10, 1957

2,816,266

PHASE INDICATOR

Paul M. Nadolski, Boonton, N. J., assignor to Bell Telephone Laboratories, Incorporated, New York, N. Y., a corporation of New York Application August 24, 1956, Serial No. 605,998

7 Claims. (Cl. 324—88)

This invention relates to the art of electrical measurement and more particularly to a means for measuring the phase angle between two alternating voltages.

A conventional oscillographic means for measuring the relative phase angle between two alternating voltages generally consists of impressing the two voltages on the respective axes of a cathode ray oscilloscope to thereby produce an elliptical Lissajous figure. The phase angle is then determined by measuring the ratio of the distance between the intercepts of the ellipse with the vetrical axis to the total height of the ellipse. This ratio is proportional to the sine of the phase angle which is obtained by reference to trigonometric tables. Where a large number of phase-angle measurements are to be made, it is evident that the conventional method is very time consuming and in some cases prohibited from an economic standpoint. It is desirable that some means be provided for directly indicating the phase angle based on the aforesaid dimensions of the elliptical trace.

It is the object of this invention to provide means for directly indicating the phase angle from measurements derived from the conventional elliptical Lissajous figure.

The foregoing object is achieved by this invention which comprises a conventional cathode ray oscilloscope, upon the two axes of which are impressed the two voltages whose phase is to be measured to produce an elliptical trace. By rapidly switching from the aforesaid elliptical trace to a vertical line produced by a calibrated source of alternating voltage, the two resulting traces appear simultaneously on the oscilloscope screen. The amplitude of the calibrated voltage is adjusted until the vertical line produced thereby just reaches the intercept points of the ellipse on the vertical axis. The phase angle is then directly measured by and read from the amplitude of the alternating voltage from the calibrated source.

The invention may be better understood by referring to the accompanying drawings in which.

Figure 1:
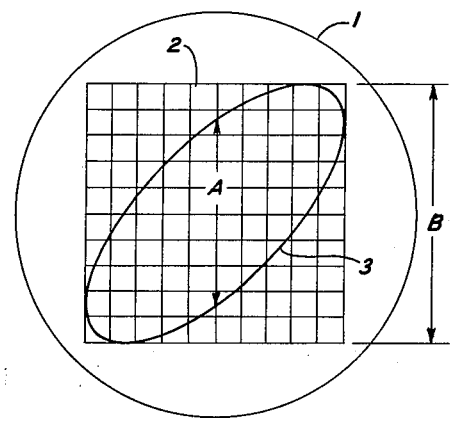
Fig. 1 represents a typical elliptical Lissajous figure with the amplitudes adjusted to equality in both axes.
Figure 3:
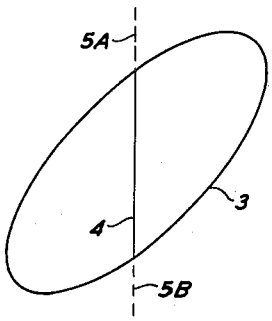
Fig. 3 illustrates the superposition of the calibrating trace on the Lissajous figure during the process of measurement.

In Fig. 1 an oscilloscope screen 1 may contain a graduated screen 2 which is preferably, but not necessarily, square in shape and upon which is projected an elliptical Lissajous figure 3. This figure is produced, as is well known, by simply impressing voltages of equal frequency on the two deflecting axes of the oscilloscope. The phase angle between these two voltages is obtained as the angle whose sine is equal to the ratio of A to B. According to conventional practice, the distance A between the intercept points is read directly from the screen by counting the squares. This distance is then divided by the total height of the ellipse B, which represents the sine of the required phase angle.

Figure 2:
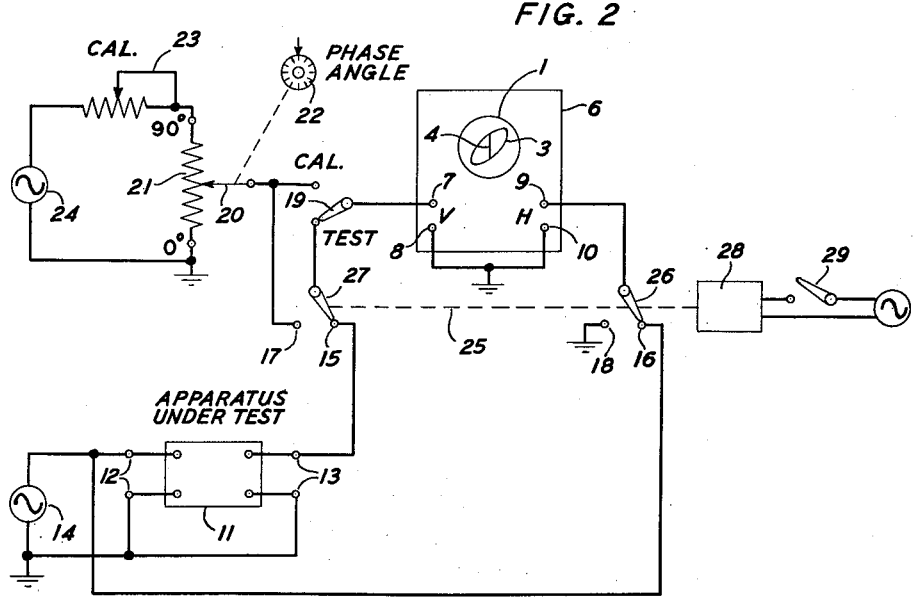
Fig. 2 illustrates one embodiment of the invention.

In accordance with this invention, the necessity for measuring the dimensions A and B in Fig. 1 is obviated by providing apparatus which alternately switches from the elliptical trace to a vertical line superimposed on the vertical axis of the oscilloscope, this line being produced by an alternating voltage from a calibrated source. In Fig. 2 it will be noted that oscilloscope 6 has one pair of input terminals 7 and 8, which are connected to the vertical axis, and another pair of input terminals 9 and 10, which are connected to the horizontal axis. The oscilloscope screen 1 discloses the elliptical trace 3 and the vertical line 4 superimposed thereon in essentially the manner it would appear to an operator using the equipment. For the sake of simplicity, the grid 2 of Fig. 1 is not shown in Fig. 2, although it is customarily a part of most commercial oscilloscopes. The two voltages which are to be impressed on the vertical and horizontal axes of the oscilloscope are obtained from the input terminals 12 and output terminals 13 of an apparatus under test 11. These voltages are supplied from an alternating-current source 14. Of course, it is not essential that these two voltages be obtained in this manner because they could, in the alternative, be derived from any two points in a system, or from two separate generators which are synchronized. To illustrate the invention, it is convenient to assume that the two voltages are obtained as the input and output voltages of a piece of apparatus under test simply because this is a common situation requiring such phase measurements. The voltage from terminals 12 is applied to the horizontal axis by way of switch contact 16 and switch pole 26 of a two-pole double-throw switch 25. The output terminals 13 are connected to the vertical axis by way of switch point 15, switch pole 27, and a calibrating switch 19, the latter in its Test position. It will be evident that the connections just described set up conventional circuitry which will produce the elliptical trace 3 on the oscilloscope screen.

Let it now be assumed that switch 25 is moved to its second position so that switch pole 26 engages grounded switch point 18 and switch pole 27 engages switch point 17. In this position, it will be evident that the horizontal terminals 9 and 10 are short-circuited so there will be no horizontal deflection of the trace on the oscilloscope screen, but the vertical deflection will be produced by the output voltage from the calibrated potentiometer 21. It is desired that the length of this vertical trace 4 should be just sufficient to measure the distance between the vertical intercepts of the elliptical trace 3. This is accomplished by merely adjusting the slider 20 of potentiometer 21. Reference to Fig. 3 will show the initial conditions where the calibrated voltage is too large, thus extending line 4 to the positions 5A and 5B, respectively. When slider 20 is properly adjusted, only the solid portion of line 4 remains. The figure will appear as shown in Fig. 2 with both traces 3 and 4 simultaneously appearing on the screen provided that switch 25 is operated between its two positions with sufficient rapidity. While this switch may be operated manually, it is preferred that it be operated by electromagnetic means such as a relay coil 28 which is energized from an alternating-current source through switch 29. It is to be understood that when switch 29 is closed, coil 28 will cause switch poles 26 and 27 to vibrate rapidly between their two extreme positions.

The calibrated source is energized from a source of alternating current 24. It is preferable that the frequency of this source be substantially higher than the frequency operating magnetic switch 25. When slider 20 is in its upper position, the calibrating rheostat 23 is adjusted until the vertical height of trace 4 is exactly equal to the total height of the elliptical trace. A suitable procedure for accomplishing this calibration is to open switch 29 to stop the vibration of the two-position switch 25. The horizontal input amplifier, normally a part of the commercial oscilloscope, is turned to its Off position so that no input is applied to the horizontal axis of the oscilloscope. Switch 19 is then put in its Test position so that one of the voltages, the voltage from terminals 13, is applied to the vertical axis of the oscilloscope. The gain of the vertical axis amplifier in the oscilloscope is adjusted until this voltage from terminals 13 produces a desired amplitude on the screen. Switch 19 is then moved to its Cal. position, and slider 20 is moved to its uppermost position on potentiometer 21. The calibrating rheostat 23 is then adjusted until the vertical trace, produced by the calibrated source, is exactly equal to that previously produced by the voltage from the terminals 13. It is immaterial what the amplitude of the horizontal trace is, but it is customary and desirable to make it approximately equal to the vertical amplitude. The slider 20 is mechanically coupled to a dial 22 which is calibrated to read the phase angle directly. It will be evident that when the slider 20 is at the upper end of the potentiometer, the phase angle would be 90 degrees and that when it is on its lowermost position, the phase angle would be zero degrees. The intermediate points on the dial 22 will have voltages proportional to the sine of the phase angle and may be determined by any suitable laboratory means well known in the art.

From the above description and with the apparatus adjusted as described, it will be evident that when both voltages are impressed on the oscilloscope an elliptical trace 3 will be formed and that a very short interval thereafter, when switch 25 moves to its other position, a vertical line 4 will be produced and that these two traces will appear simultaneously to the observer. It is then only necessary for him to rotate the phase angle dial 22 until the length of the vertical line 4 appears inside the elliptical trace 3, as shown in Fig. 2. The phase angle is then read directly from dial 22. No computations of any kind are necessary, and the adjustments are very simple and rapidly done.

Figure 4:
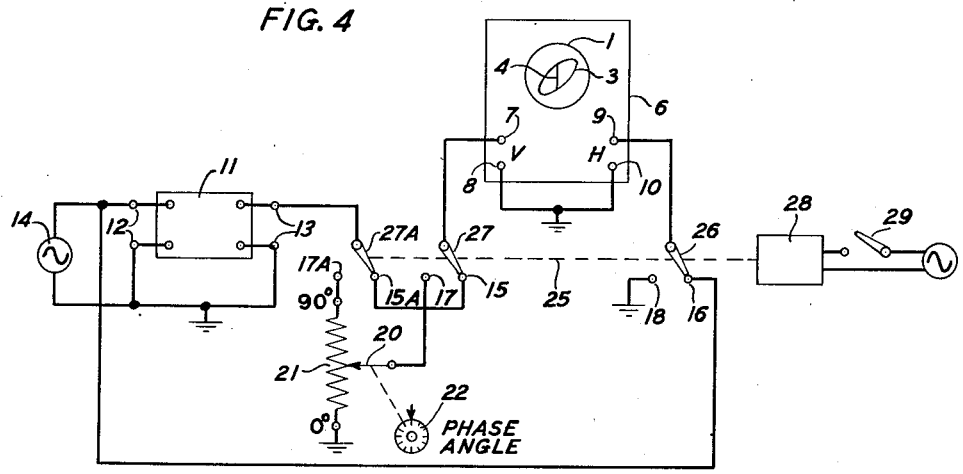
Figs. 4 and 5 illustrate slight variants of the invention in which the calibrated source is self-calibrated by directly energizing it with one of the voltages under measurement.

Fig. 4 differs from Fig. 2 only in that the calibrating source is derived from the voltage of terminals 13 instead of from a separate source 24, as in Fig. 2. In Fig. 4 an additional switch pole 27A is provided for switching potentiometer 21 across terminals 13 each time switch 25 moves to ground the horizontal deflector terminals and to simultaneously connect the calibrated source to the vertical deflecting terminals of the oscilloscope. The circuits are the same as previously described except that switch pole 27A moves between switch points 15A and 17A, respectively. It is evident that when the switch pole 27A is on switch point 15A, the voltage between terminals 13 is impressed across terminals 7 and 8 of the oscilloscope and that when switch pole 27A is on switch point 17A, the voltage between terminals 13 is impressed directly across the entire potentiometer 21. As in the case of Fig. 2, slider 20 is connected to terminal 7 of the oscilloscope through switch pole 27. The apparatus of Fig. 4 is self-calibrating. It will be observed that the voltage across potentiometer 21, during the period that the vertical trace 4 is produced, is exactly equal to the voltage on the vertical axis of the oscilloscope when trace 3 is being produced, this by reason of the fact that it is the same voltage in each case. It is, of course, necessary that the resistance of potentiometer 21 be high compared with the output impedance at terminals 13. Where this condition cannot be met, it is quite obvious that terminals 13 can be coupled to potentiometer 21 through a conventional unity gain buffer amplifier.

Figure 5:
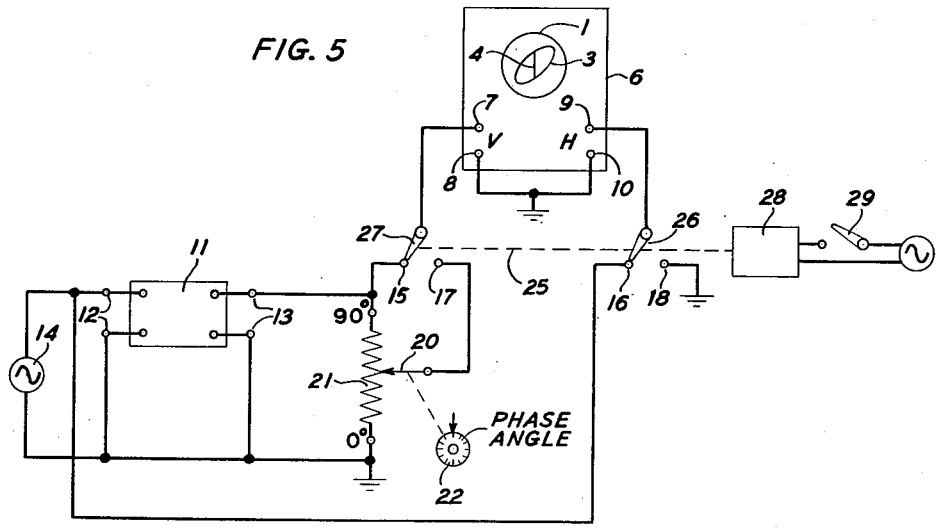

This self-calibrating feature is also embodied in Fig. 5, but in this case, the potentiometer 21 is permanently connected across the output terminals 13, thereby eliminating the auxiliary switch pole 27A. In this case, it will be evident that when switch pole 27 is on switch point 15, the voltage of terminals 13 is impressed on the vertical axis of the oscilloscope and that when switch pole 27 is on switch point 17, the calibrated voltage output of potentiometer 21 is impressed on the vertical axis of the oscilloscope. The operation of this circuit, otherwise, is the same as previously described for Fig. 2 except that, as in the case of Fig. 4, no calibrating procedure is required, as the potentiometer will always be properly calibrated.

Figure 6:
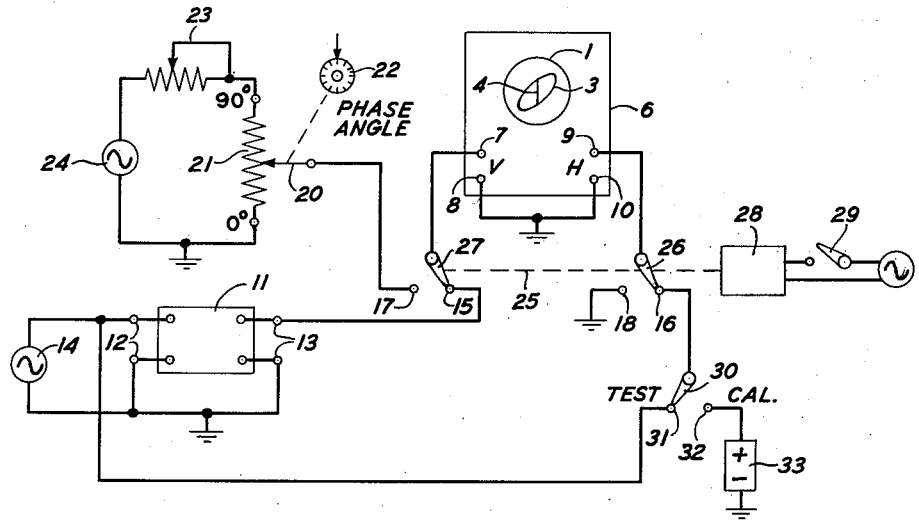
Fig. 6 illustrates a convenient means for calibrating the calibrated source in a circuit of the type shown in Fig. 2.
Figure 7:
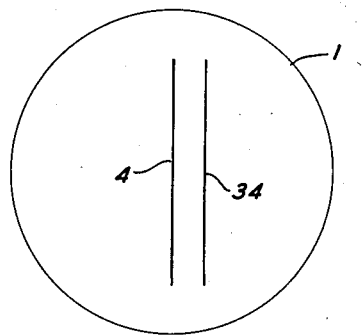
Fig. 7 illustrates the type of traces obtained with the calibrating apparatus of Fig. 6.

The circuit of Fig. 6 is identical with that of Fig. 2 with but one exception. Instead of calibrating the potentiometer 21 by means of a calibrating switch 19 and the procedures described above for Fig. 2, a calibrating switch 30 is connected in the circuit to the horizontal axis of the oscilloscope. In one position of this switch, it connects to switch point 31 and to the voltage appearing across terminals 12. In this position and with switch 25 operating, both the elliptical trace 3 and the vertical trace 4 will appear simultaneously on the screen in the same manner as previously described for Fig. 2. When switch 30 is moved to switch point 32, potentiometer 21 may be calibrated. In this position, a fixed voltage from source 33 is made available to the horizontal axis of the oscilloscope in place of the alternating voltage from terminals 12. Consequently, instead of producing the elliptical trace 3 with the vertical trace 4, a second vertical trace 34, parallel to trace 4, is produced as shown in Fig. 7. The distance between these two parallel lines is determined by the magnitude of the direct voltage source 33. This is made only large enough to produce a clear separation between the lines. It will now be evident that the vertical amplitude of trace 4 is produced by the output derived from potentiometer 21 while the vertical trace 34 is produced by the alternating voltage from terminals 13. The gain of the vertical amplifier in the oscilloscope is adjusted until a suitable length is obtained for line 34 which will correspond with the vertical amplitude of the elliptical trace 3. To calibrate potentiometer 21, it is then only necessary to set dial 22 at 90 degrees and adjust rheostat 23 until vertical line 4 is equal in length to line 34. Switch 30 is then moved back to point 31 and measurements proceed in the same manner as previously described for Fig. 2.

What is claimed is:

1. Means for measuring the relative phase between two sources of alternating voltage of the same frequency comprising an oscilloscope having a vertical deflecting means and a horizontal deflecting means, a switch having two positions, circuit means included in one position of said switch to connect one of said two voltage sources to one of said deflecting means and to simultaneously connect the other voltage source to the other deflecting means whereby the oscilloscope may produce an elliptical trace of shape determined by said relative phase, a calibrated source of alternating voltage, and other circuit means included in the second position of said switch to substitute said calibrated source for one of said two voltage sources and to simultaneously substitute a short-circuit for the other of said two voltage sources whereby the oscilloscope may produce a straight line of length proportional to said calibrated voltage.

2. The combination of claim 1 wherein said calibrated source comprises a potentiometer connected across one of said two alternating voltage sources whereby said calibrated source is self-calibrating.

3. The combination of claim 1 and an indicating means mechanically coupled to said calibrated source having indicia directly reading the phase angle.

4. The combination of claim 1 and a means for calibrating said calibrated source comprising a source of direct voltage, a single-pole double-throw switch having two switch contacts and a switch arm, one of said contacts being connected to one of said two alternating voltage sources, the other contact being connected to said source of direct voltage, and the arm being connected to said two-position switch means for the application of said voltages to one of said oscilloscope deflecting means.

5. Means for measuring the relative phase between two sources of alternating voltage of the same frequency comprising an oscilloscope having a pair of mutually perpendicular deflecting means, a vibrating two-position switch having at least two poles, the first position of said switch including a circuit path from one of said sources to one of said pair of deflecting means through one switch pole and simultaneously including another circuit path from the other source to the other deflecting means through another switch pole, a calibrated source of alternating voltage, the second position of said switch having circuit means including said one switch pole for disconnecting said one source from its deflecting means and for substituting said calibrated source therefor, and having other circuit means including said other switch pole for disconnecting said other source from its deflecting means and for substituting a short-circuit therefor.

6. The combination of claim 5 wherein said calibrated source comprises a potentiometer connected across one of said two alternating voltage sources whereby said calibrated source is self-calibrating.

7. The combination of claim 5 and indicating means mechanically coupled to said calibrated source having indicia directly reading the phase angle.

References Cited in the file of this patent

UNITED STATES PATENTS

| | | |
|---|---|---|
| 2,678,406 | Beale | May 11, 1954 |
| 2,778,972 | Ellis | Jan. 22, 1957 |